United States Patent [19]

Rozenboom

[11] 3,721,864
[45] March 20, 1973

[54] ELECTRICAL PANELBOARD WITH STACKED BUS BARS AND MOUNTING PAN FORMED OF GROOVED BARS

[75] Inventor: Gustave Rozenboom, Kokomo, Ind.
[73] Assignee: Square D Company, Park Ridge, Ill.
[22] Filed: May 20, 1971
[21] Appl. No.: 145,269

[52] U.S. Cl. .....................317/119, 29/624, 29/626
[51] Int. Cl. ................................................H02b 1/02
[58] Field of Search ................317/119; 29/624, 626

[56] References Cited

UNITED STATES PATENTS

| | | | |
|---|---|---|---|
| R26,737 | 12/1969 | Jorgensen et al. | 317/119 |
| 3,309,580 | 3/1967 | Jacobs et al. | 317/119 |
| 3,309,581 | 3/1967 | Klein | 317/119 |
| 3,403,299 | 9/1968 | Mrowka et al. | 317/119 X |
| 3,403,301 | 9/1968 | Mrowka et al. | 317/119 |
| 3,540,718 | 11/1970 | Heffron et al. | 29/626 X |
| 3,590,332 | 6/1971 | Anderson et al. | 317/119 |
| 3,366,846 | 1/1968 | Brumfield | 317/119 |
| 3,346,777 | 10/1967 | Leonard et al. | 317/119 |
| 3,354,357 | 11/1967 | Jorgensen et al. | 317/119 |

Primary Examiner—Richard B. Wilkinson
Assistant Examiner—Stanley J. Witkowki
Attorney—Harold J. Rathbun and Paul J. Rose

[57] ABSTRACT

An electrical panelboard having stacked elongated, flatwise aligned, flat bus bars and plug-in load-side connectors is provided with a mounting pan formed of flat, edgewise aligned extruded aluminum bars extending parallel to the bus bars in spaced relationship thereto edgewise thereof. Electric circuit breakers for use on the panelboard are provided with plug-on line terminal jaws for plugging on the bus bars and stab load terminals for plugging into the load-side connectors by movement of the circuit breakers parallel to the mounting pan toward the bus bars. Various combinations of two types of extruded bars are used to accommodate four different sizes of plug-in load-side connectors. The bars are longitudinally grooved to receive mounting screws for the plug-in load-side connectors anywhere along their length. Panelboards of various widths respectively accommodating circuit breakers of various sizes may be constructed by mounting various numbers of the grooved bars parallel to and at various distances respectively from each of a plurality of bus bar stacks.

10 Claims, 9 Drawing Figures

INVENTOR.
GUSTAVE ROZENBOOM

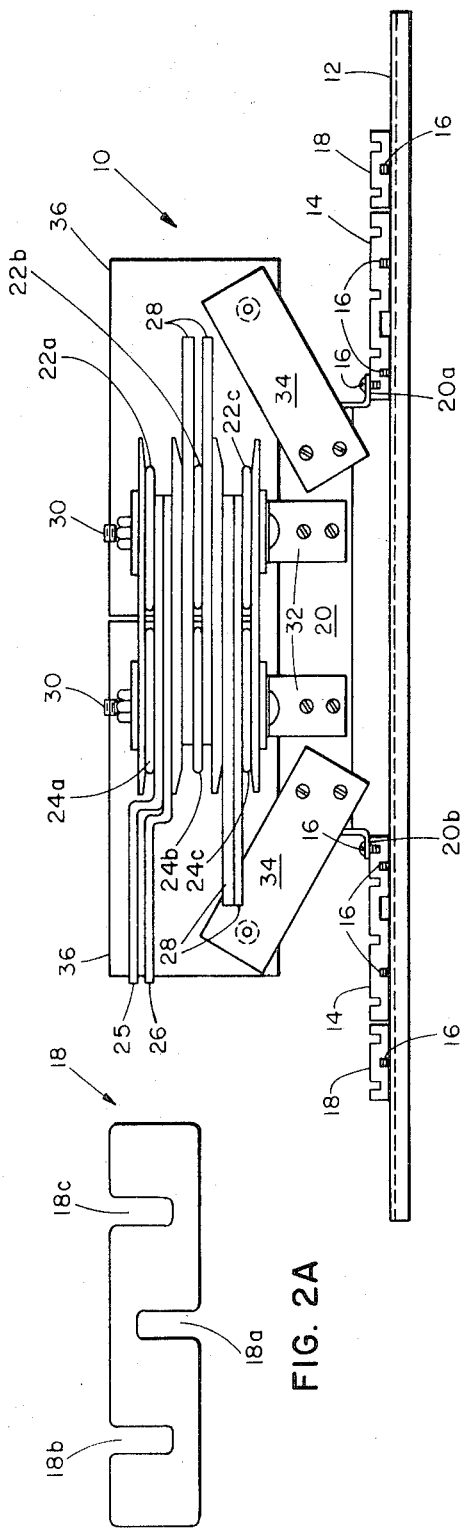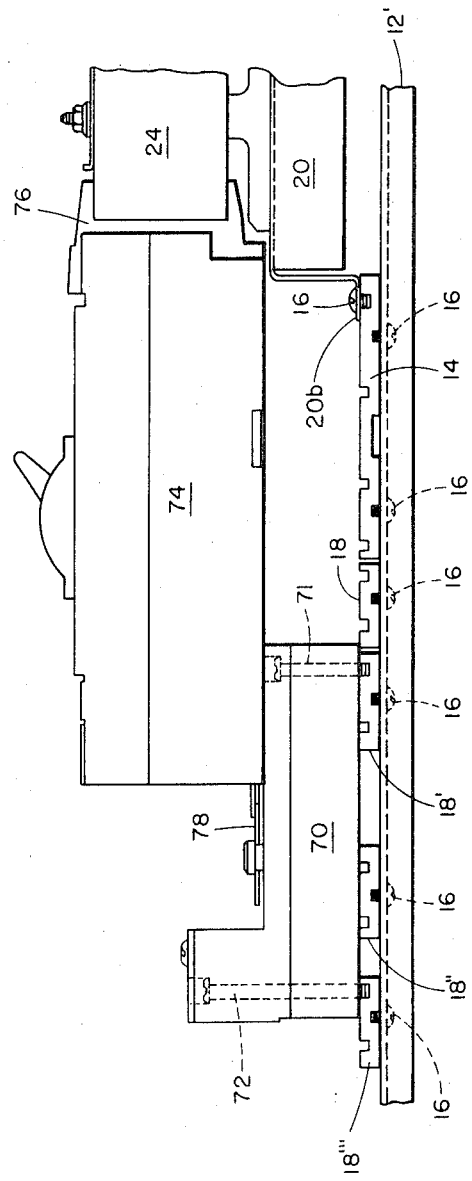

INVENTOR.
GUSTAVE ROZENBOOM

INVENTOR.
GUSTAVE ROZENBOOM

ELECTRICAL PANELBOARD WITH STACKED BUS BARS AND MOUNTING PAN FORMED OF GROOVED BARS

Prior panelboards with stacked bus bars and sheet steel mounting pans are disclosed in U.S. Pat. Nos. 3,346,777, issued Oct. 10, 1967, and 3,354,357, issued Nov. 21, 1967, and in copending application, Ser. No. 2149, filed Jan. 12, 1970, and assigned to the assignee of this application. Such mounting pans were relatively heavy, expensive, and flexible in the larger sizes. In addition, a relatively large number of different types of mounting pans had to be manufactured and stocked to provide for mounting various combinations of different-sized circuit breakers.

An object of the invention is to provide a stronger, less expensive, and lighter mounting pan for an electrical panelboard of the type having stacked bus bars.

Another object is to provide a mounting pan having two types of component bars which may be selected and arranged according to various sizes of circuit breakers and plug-in load-side connectors to be accommodated.

Other objects and advantages will become apparent when the following specification is considered along with the accompanying drawings in which:

FIG. 2 is a top view of the mounting pan of FIG. 1;

FIG. 2a is an enlarged end view of one of the relatively narrow component bars of the mounting pan of FIG. 1;

FIG. 3 is a view taken substantially along the line 3—3 of FIG. 7 and showing the largest of four sizes of circuit breakers and plug-in load-side connectors mounted on the component bars, a bus bar stack being shown schematically and without cross hatching;

Figure 1:
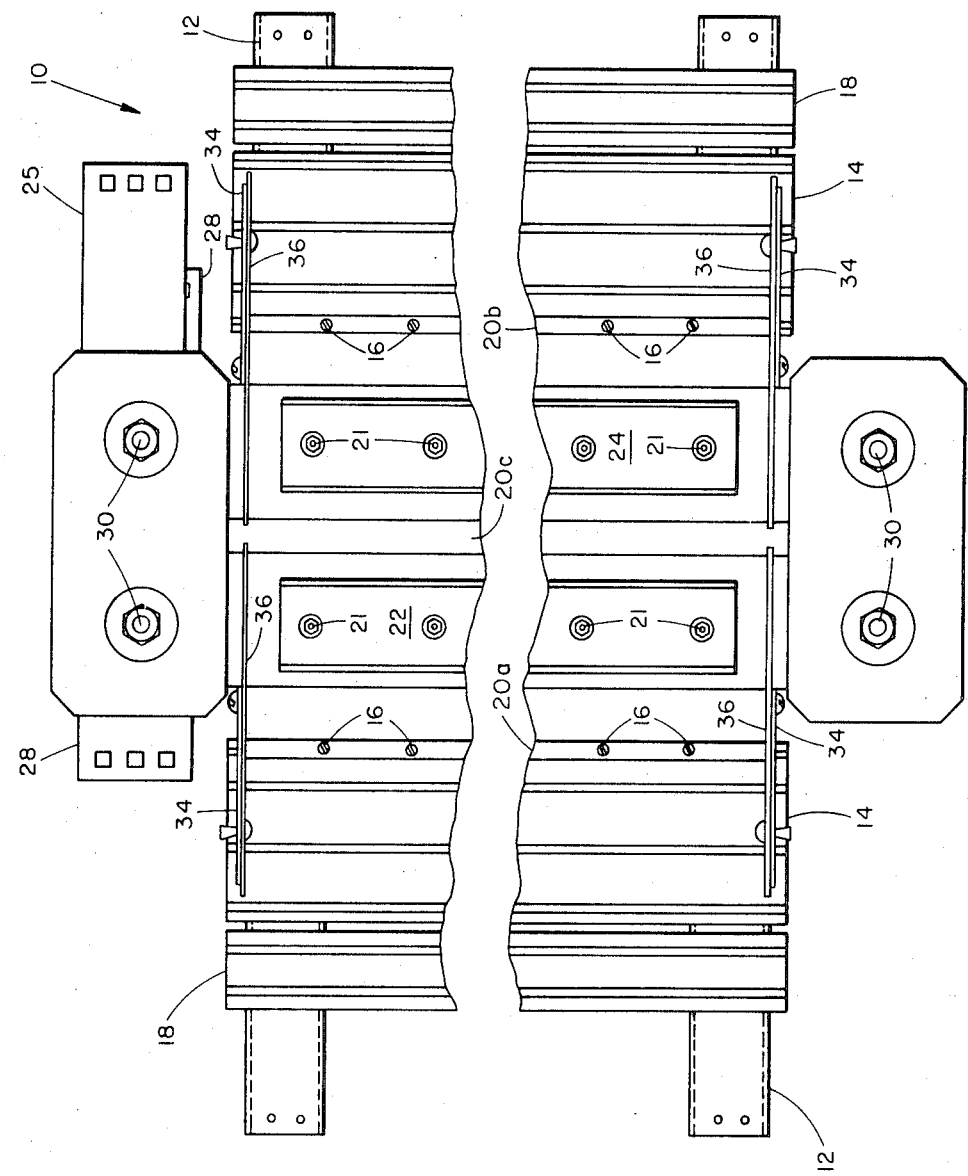
FIG. 1 is a front view of a mounting pan constructed in accordance with the invention and having component bars arranged to receive two sizes of circuit breakers and plug-in load-side connectors, a central portion being broken away.

With reference to the drawings, a mounting pan 10 constructed in accordance with the invention is shown in FIGS. 1 and 2. The mounting pan 10 includes a pair of spaced parallel mounting members 12 preferably of channel shape. Two relatively wide, grooved circuit breaker mounting bar members 14, preferably formed of aluminum alloy by an extrusion process, are secured in spaced parallel relationship adjacent opposite ends respectively to the mounting members 12 by a plurality of screws 16, each end of each bar member 14 being secured by two of the screws 16 to the respective mounting member 12, and each screw 16 being inserted from the rear of its respective mounting number 12 and threaded as shown in FIG. 2 into one of two rear grooves 14a and 14b (FIG. 6a) of the bar member 14, the threads of the screw cutting into opposite sides of the groove, as will be understood.

Also secured to the mounting members 12 and spaced outwardly of the bar members 14 are two relatively narrow, grooved circuit breaker mounting bar members 18, preferably of extruded aluminum alloy, each end of each bar member 18 being secured to the respective mounting member 12 by one of the screws 16 threaded as shown into a rear groove of the bar member 18 identified as groove 18a in FIG. 2a.

Means is provided for mounting a stack of bus bars, or two stacks of bus bars having respective pairs of bus bars electrically connected in parallel, between the bar members 14. This means includes a box member 20 having outwardly extending opposite side flanges 20a and 20b secured respectively to the bar members 14 by a plurality of the screws 16 each threaded into a groove 14c (FIG. 6a) on the respective bar member. Secured to a bottom 20c of the box member 20 by a plurality of bolts 21 are two stacks 22 and 24 (FIG. 1) of bus bars, insulators, and clamping members such as shown in FIGS. 2 and 3 of the aforementioned U.S. Pat. No. 3,354,357, to which reference may be had for a detailed description.

As best shown in FIG. 2, a pair of feeder bus bars 25 and 26 supply power to a bus bar 24a of the stack 24 and a bus bar 22a of the stack 22, a pair of identical feeder bus bars 28 supply power to a bus bar 22b and a bus bar 24b, and a second pair of identical feeder bus bars 28 supply power to a bus bar 24c of the stack 24 and a bus bar 22c of the stack 22. The feeder bus bars are clamped to the respective pairs of bus bars of the stacks by a pair of bolts 30. A second pair of bolts 30 adjacent the opposite ends of the stacks 22 and 24 from the feeder bus bars 25, 26, and 28 clamps the respective pairs of bus bars of the stacks 22 and 24 to appropriate splice plates (not shown) connecting the pairs of bus bars electrically in parallel. Each of the stacks 22 and 24 is braced at opposite ends respectively by a pair of right-angle brackets 32, one of which is shown for each stack in FIG. 2. Each bracket 32 has one leg portion clamped by a respective bolt 30 and the other leg portion secured to an end wall of the box member 20. Also secured to each end wall of the box member 20 is a pair of plate members 34 each of which supports an insulating barrier member 36 through which the bus bars of the respective stack 22 or 24 extend.

The mounting members 12 are shown in FIGS. 1 and 2 as long enough to accommodate two of the relatively narrow grooved bar members 18 disposed respectively on opposite sides of the box member 20 outwardly of the two relatively wide grooved bar members 14. In the embodiment of FIGS. 3–7, longer mounting members 12' are provided, to accommodate additional bar members 18.

Figure 4:
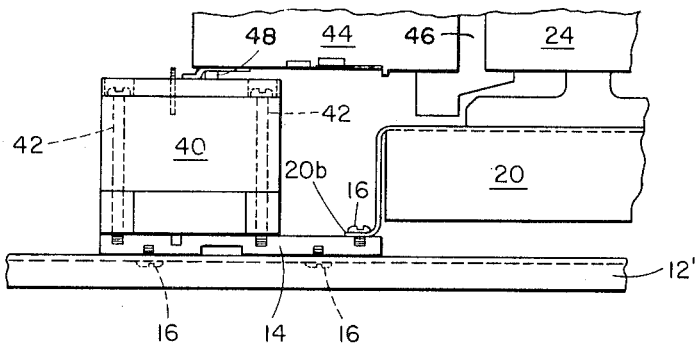
FIG. 4 is a view similar to FIG. 3, but fragmentarily showing the smallest of four sizes of circuit breakers and plug-in load-side connectors mounted on a single component bar of the relatively wide type.

FIG. 4 shows a circuit breaker mounting means in the form of a plug-in load-side connector 40 of the type disclosed in FIGS. 2–6 of the aforementioned copending application, Ser. No. 2149. The connector 40 is secured to the bar member 14 by pairs of screws 42 threaded respectively into a pair of grooves 14d and 14e (FIG. 6a). So positioned, the connector 40 accommodates a circuit breaker 44 of the type disclosed in U.S. Pat. No. 3,341,791, issued Sept. 12, 1967, but having a shroud 46, as disclosed in FIGS. 3 and 5 of the aforementioned U.S. Pat. No. 3,346,777, in which plug-on line-side jaws are provided for plugging on the bus bars of the stack 24, and having stab terminals 48, as disclosed in FIG. 4 of the aforementioned copending application, Ser. No. 2149, for plugging into the connector 40.

Figure 5:
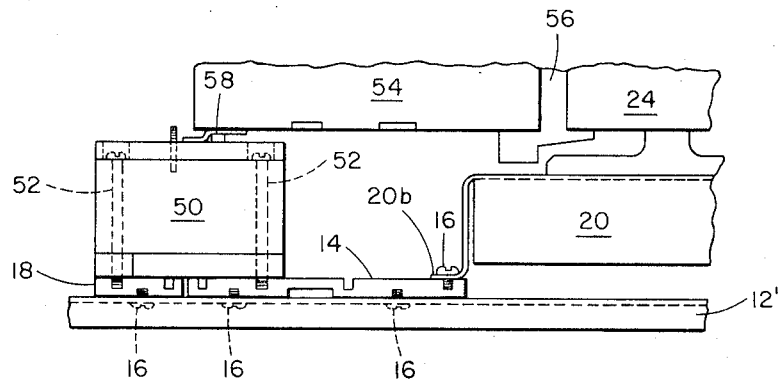
FIGS. 5 and 6 are views similar to FIG. 4, but respectively showing the two next larger of four sizes of circuit breakers and plug-in load-side connectors mounted on a mounting pan with additional component bars of the relatively narrow type.

FIG. 5 shows a plug-in load-side connector 50 similar to but larger than the connector 40. The connector 50 is secured to the bar member 14 by a pair of screws 52 threaded into a groove 14f (FIG. 6a) and to the bar member 18 by a pair of screws 52 threaded into a groove 18b (FIG. 2a). So positioned, the connector 50 accommodates a circuit breaker 54 of the type disclosed in U.S. Pat. No. 3,345,591, issued Oct. 3, 1967, but having a shroud 56, as disclosed in FIGS. 3 and 5 of the aforementioned U.S. Pat. No. 3,346,777, in which plug-on line-side jaws are provided for plugging on the bus bars of the stack 24, and having stab terminals 58, as disclosed in FIG. 4 of the aforementioned copending application, Ser. No. 2149, for plugging into the connector 50.

Figure 6:
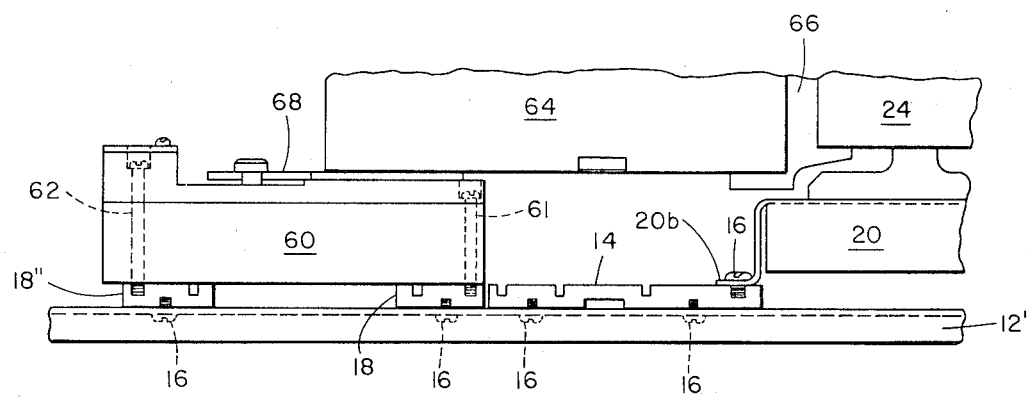
Figure 6A:
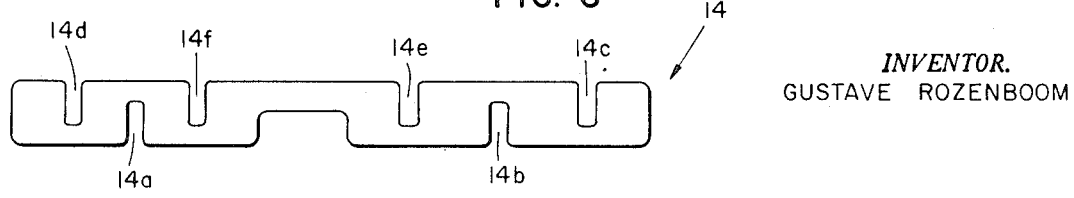
FIG. 6a is an enlarged end view of one of the relatively wide component bars of the mounting pan of FIG. 1.

FIG. 6 shows a plug-in load-side connector 60 of the type disclosed in FIGS. 8–10 of the aforementioned copending application Ser. No. 2149. The connector 60 is secured to the bar member 18 by a pair of plugging 61 threaded into a groove 18c (FIG. 2a) and to an additional bar member 18'' by a pair of screws 62 threaded into the groove 18b (FIG. 2a) of the bar member 18''. So positioned, the connector 60 accommodates a circuit breaker 64 of the type disclosed in U.S. Pat. No. 3,355,685, issued Nov. 28, 1967, but having a shroud 66, as disclosed in FIGS. 3 and 5 of the aforementioned U.S. Pat. No. 3,346,777, in which plug-on line-side jaws are provided for plugging on the bus bars of the stack 24, having stab terminals, as disclosed in FIG. 9 of the aforementioned copending application, Ser. No. 2149, and having a mounting bracket 68 with driving cam, as disclosed in copending application, Ser. No. 802,102, filed Feb. 25, 1969.

FIG. 3 shows a plug-in load-side connector 70 similar to the connector 60. The connector 70 is secured to an additional bar member 18', disposed between the bar members 18 and 18'', by a pair of screws 71 threaded into the groove 18c (FIG. 2a) of the bar member 18' and to an additional bar member 18''', spaced outwardly of the bar member 18–, by a pair of screws threaded into the groove 18c (FIG. 2a) of the bar member 18'''. so positioned, the connector 70 accommodates a circuit breaker 74 of the type disclosed in U.S. Pat. No. 3,525,837, issued Aug. 25, 1970, but having a shroud 76, as disclosed in FIGS. 3 and 5 of the aforementioned U.S. Pat. No. 3,346,777, in which plug-on line-side jaws are provided for plugging on the bus bars of the stack 24, having stab terminals, as disclosed in FIG. 9 of the aforementioned copending application, Ser. No. 2149, and having a mounting bracket 78 with driving cam, as disclosed in the aforementioned copending application, Ser. No. 802,102.

Figure 7:
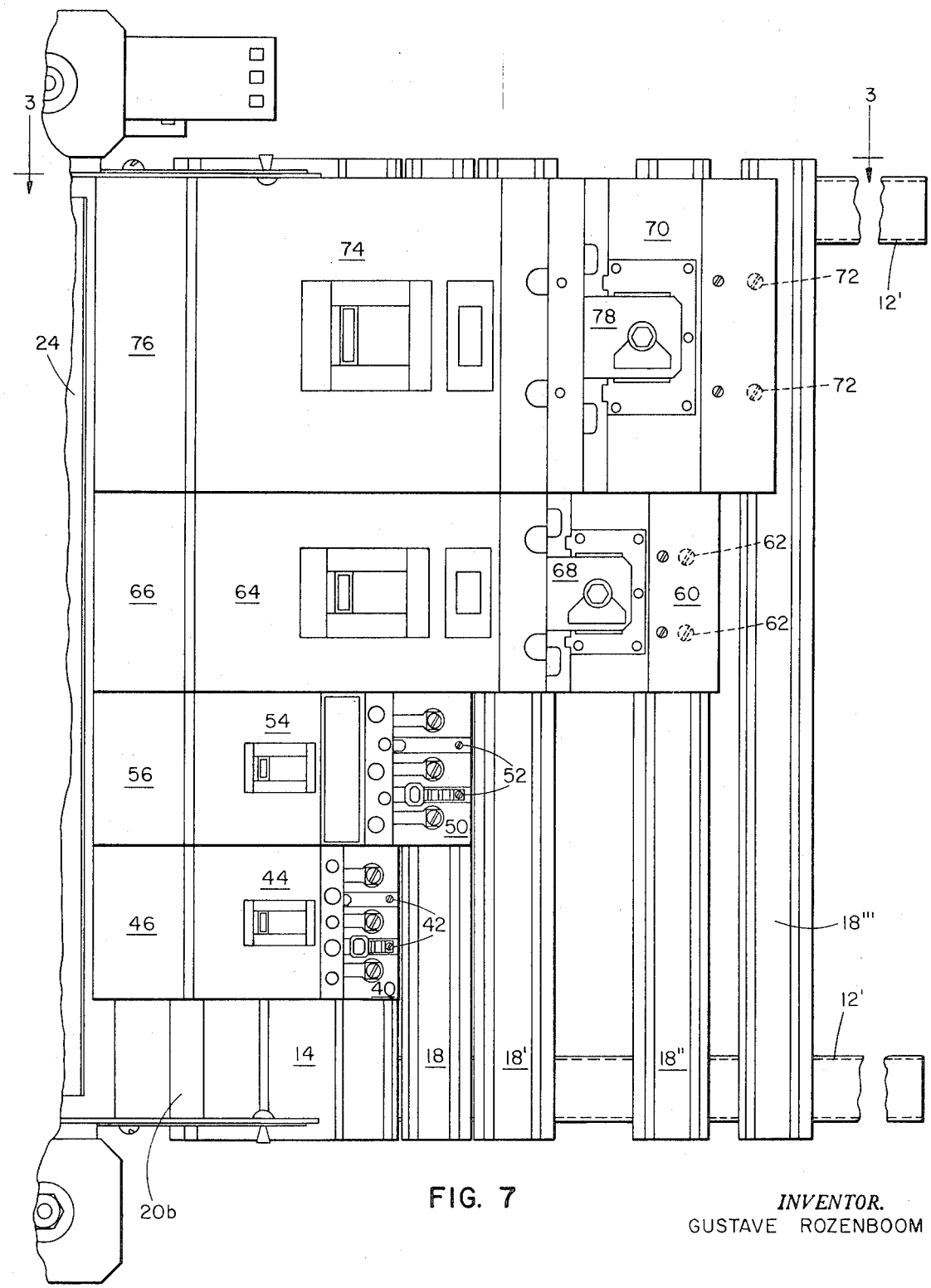
FIG. 7 is a fragmentary front view of a mounting pan similar to the right-hand portion of FIG. 1, but showing four sizes of circuit breakers and plug-in load-side connectors mounted thereon, with the requisite component bars.

FIG. 7 shows an electrical panelboard having one of the bar members 14 and four of the bar members 18 disposed on one side of the bus bar stack 24, as in FIG. 3, and one of each of the plug-in load-side connectors 40, 50, 60, and 70 and their respective circuit breakers 44, 54, 64, and 74 mounted thereon.

Should it be desired to construct a panelboard for receiving only connectors such as the connector 40 and corresponding circuit breaker 44, no bar members 18 and only two bar members 14, one on each side of the bus bar stack, are required. Designating such a panelboard as a "basic unit," two bar members 18, one on each side of the bus bar stack, may be added to construct a panelboard for receiving only connectors such as the connectors 40 and 50 and corresponding circuit breakers 44 and 54. Four bar members 18, two on each side of the bus bar stack in the positions of the bar members 18 and 18'' in FIG. 6, may be added to the basic unit to construct a panelboard for receiving only connectors such as the connectors 40, 50, and 60 and corresponding circuit breakers 44, 54, and 64. Four bar members 18, two on each side of the bus bar stack in the positions of the bar members 18' and 18''' in FIG. 3, may be added to the basic unit to construct a panelboard for receiving only connectors such as the connectors 40 and 70 and corresponding circuit breakers 44 and 74. Six bar members 18, three on each side of the bus bar stack in the positions of the bar members 18,18' and 18''' in FIG. 3, may be added to the basic unit to construct a panelboard for receiving only connectors such as the connectors 40, 50, and 70 and corresponding circuit breakers 44, 54, and 74. Adding eight bar members 18 to the basic unit, four on each side of the bus bar stack, results in a panelboard, as shown in FIGS. 3 and 7, which can receive any of the four connectors 40, 50, 60, and 70 and corresponding circuit breakers 44, 54, 64, and 74.

While the preferred embodiment of the invention has been described in terms of replacing the sheet steel mounting pan of the copending application, Ser. No. 2149, with extruded aluminum grooved bar members, it is equally applicable to replacing the sheet steel mounting pans of the U.S. Pat. Nos. 3,346,777 and 3,354,357, with extruded aluminum grooved bar members. In the latter modification, instead of the plug-in load-side connectors such as the connectors 40, 50, 60, and 70, the circuit breaker mounting means may be screws, similar to the screws 42, extending through casings of the circuit breakers or brackets attached thereto and threaded into grooves of the bar members 14 or 18.

Various other modifications may be made in the structure shown and described without departing from the spirit and scope of the invention.

I claim:

1. A method of manufacturing a plurality of electrical panelboards of various widths respectively to accommodate circuit breakers of various sizes, the method comprising providing a plurality of stacks of bus bars each including a plurality of elongated, flatwise aligned, flat bus bars, providing a plurality of flat, longitudinally grooved bars, and mounting various numbers of the grooved bars in edgewise aligned relationship to each other and parallel to and at various distances respectively from each of the stacks of bus bars edgewise of the bus bars therein the accordance with the sizes of circuit breakers to be mounted on the respective panelboards.

2. A method as claimed in claim 1 including mounting various plug-in load-side connector units, respectively compatible with the various sizes circuit breakers, on the grooved bars by means of screws extending through the connector units and threaded into the grooves of the bars.

3. An electrical circuit breaker panelboard comprising a stack of elongated, flatwise aligned, flat bus bars, a plurality of flat, longitudinally grooved circuit breaker mounting bars, and means mounting the stack of bus bars and the grooved bars in a relationship such that the grooved bars are parallel to and respectively at various distances from the stack of bus bars edgewise of the bus bars therein and are edgewise aligned with each other.

4. An electrical circuit breaker panelboard as claimed in claim 3 including a plurality of plug-in load-side connectors respectively mounted on various ones or pairs of the grooved bars.

5. An electrical circuit breaker panelboard as claimed in claim 4 including a plurality of circuit breakers each having plug-on line terminal jaw means plugged onto bus bars of the stack and plug-in load terminal means plugged into a respective one of the plug-in load-side connectors.

6. An electrical circuit breaker panelboard as claimed in claim 3 including a plurality of circuit breakers each having plug-on line terminal jaw means plugged onto bus bars of the stack, and a plurality of circuit breaker mounting means respectively mounting the circuit breakers on various ones or pairs of the grooved bars.

7. An electrical circuit breaker panelboard as claimed in claim 6 wherein the circuit breaker mounting means are plug-in load-side connectors and each circuit breaker has plug-in load terminal means plugged into a respective one of the plug-in load-side connectors.

8. An electrical circuit breaker panelboard as claimed in claim 3 wherein the grooved bars include bars which are relatively wide and bars which are relatively narrow with respect to each other.

9. An electrical circuit breaker panelboaNDED claimed in claim 8 wherein the relatively wide bars are nearer to the stack of bus bars than are the relatively narrow bars.

10. An electrical circuit breaker panelboard as claimed in claim 8 wherein the relatively wide bars have three front grooves parallel to the bus bars of the stack and the relatively narrow bars have two front grooves parallel to the bus bars of the stack.

* * * * *